United States Patent [19]
Dean et al.

[11] Patent Number: 6,167,379
[45] Date of Patent: Dec. 26, 2000

[54] SYSTEM FOR USER TO ACCEPT OR DECLINE UPDATING A CALENDAR REMOTELY WITH A PROPOSED SCHEDULE UPDATE THAT MAY HAVE SCHEDULE CONFLICTION

[75] Inventors: Matthew T. Dean, Campbell; Neal J. King, Oakland, both of Calif.

[73] Assignee: Siemens Information and Communication Networks, Inc., Boca Raton, Fla.

[21] Appl. No.: 09/047,302

[22] Filed: Mar. 24, 1998

[51] Int. Cl.[7] ............................. G06F 17/60; G06F 15/16
[52] U.S. Cl. .................................. 705/9; 705/8; 709/248
[58] Field of Search .................................. 707/10; 705/8, 705/9; 395/330; 708/112; 709/248

[56] References Cited

U.S. PATENT DOCUMENTS

| | | | |
|---|---|---|---|
| 4,866,611 | 9/1989 | Cree et al. | 364/300 |
| 5,093,901 | 3/1992 | Cree et al. | 395/330 |
| 5,197,000 | 3/1993 | Vincent | 364/401 |
| 5,261,045 | 11/1993 | Scully et al. | 395/161 |
| 5,270,920 | 12/1993 | Pearse et al. | 705/8 |
| 5,377,326 | 12/1994 | Murata et al. | 395/200 |
| 5,664,228 | 9/1997 | Mital | 395/882 |
| 5,774,867 | 6/1998 | Fitzpatrick et al. | 705/8 |
| 5,778,346 | 7/1998 | Frid-Nielsen et al. | 705/9 |
| 5,832,489 | 11/1998 | Kucala | 707/10 |

*Primary Examiner*—Le Hien Luu

[57] ABSTRACT

A method and apparatus for remotely updating a portable calendar includes a receiver for receiving a first wireless data transmission which includes a proposed scheduling update to the calendar. A memory provides storage for data comprising the calendar. A display which is responsive to the receiver displays a graphical representation of the calendar and the proposed scheduling update. A user interface, such as a set of keys of a keypad or an alternative input device, is configured to transmit control signals to a processor in response to manipulation of the interface by the user. The processor is connected to the memory to execute a calendar control program and is configured to effect a scheduling update in response to a control signal received from the user interface. A preferred embodiment of the invention provides a transmitter for transmitting a second wireless data transmission in response to the proposed schedule update, the second transmission including either a scheduling update acceptance, a scheduling update rejection, or a rescheduling proposal.

20 Claims, 5 Drawing Sheets

| 9/14/97 PROPOSED UPDATE | 9/14/97 SCHEDULE |
|---|---|
| • 9:00 - 11:00 AM<br>MEET CLIENT JONES<br>IN NYC | • 8:00 - 8:30 AM<br>SALES MEETING<br><br>• 12:00 - 1:00<br>LUNCH WITH CLIENT DAVIS<br><br>• 4:00<br>FLIGHT DEPARTURE TO SF |

1 - ACCEPT        2 - REJECT
3 - PROPOSE ALTERNATIVE

FIG. 3

SYSTEM FOR USER TO ACCEPT OR DECLINE UPDATING A CALENDAR REMOTELY WITH A PROPOSED SCHEDULE UPDATE THAT MAY HAVE SCHEDULE CONFLICTION

BACKGROUND OF THE INVENTION

The invention relates generally to portable electronic organizers. More specifically, the invention relates to a method and apparatus for remotely updating an electronic calendar supported by a portable electronic organizer.

DESCRIPTION OF THE RELATED ART

The use of portable electronic organizers has increased as the data storage and handling capacity of such devices has increased, and their size has decreased. Portable electronic organizers enable a user to enter such information as travel itineraries, work scheduling, family events, phone numbers and addresses. The portable nature of the electronic organizer enables a user to enter scheduling updates for events as they arise.

Often, an electronic organizer user will maintain a calendar in two separate devices simultaneously. For instance, a salesperson might maintain a calendar supported by a portable electronic organizer while in the field. The user makes scheduling updates to the calendar in the field as appointments are made with clients. Simultaneously, an office administrator makes entries in the salesperson's calendar supported by a desktop computer in the sales office. Depending on the length of time which passes before the two versions of the calendar are reconciled, the possibility exists that the salesperson will miss an appointment entered into the calendar supported by the desktop computer because the salesperson was unable to access the desktop computer before the time of the scheduled meeting.

One approach to solving the problem raised by separately maintaining duplicate versions of a calendar in different locations is presented in U.S. Pat. No. 5,664,228 to Mital, which describes a portable information device (PID) enabled to exchange information with a computer using either a 3.5-inch disk drive or a PCMCIA port. In one embodiment, the PID has a form factor of a 3.5-inch diskette and in another embodiment, it has a form factor of a PCMCIA card. When inserted, for example, into the 3.5 inch memory drive, the PID is able to exchange data with the computer, thereby enabling reconciliation of the two versions of the calendar.

An alternative solution to the problem of duplicate calendars is to utilize a RS-232 serial cable to connect the serial port of the computer with a specially configured I/O port on the electronic organizer. The RS-232 connection enables the exchange of data between the electronic organizer and the computer necessary to reconcile the calendars.

The PID disclosed in the Mital patent and the method of reconciling calendars utilizing an RS-232 serial cable both require a user to physically connect the electronic organizer to the computer supporting the duplicate version of the calendar. Circumstances often make it inconvenient to establish such a connection. For instance, when a salesperson is in the field for an extended period of time, the opportunity might not arise for the salesperson to make the connection to exchange scheduling updates. Furthermore, an individual who utilizes the RS-232 cable to connect to the serial port of a computer is inconvenienced by the requirement of having continuous access to the RS-232 cable.

What is needed is an apparatus and a method for reconciling two versions of a calendar, while not requiring a user to establish a physical connection from an electronic organizer to another device in order to exchange the information necessary to perform the reconciliation.

SUMMARY OF THE INVENTION

A method for reconciling a first calendar supported by an electronic organizer with a second calendar supported by a remotely located electronic device includes receiving a first proposed scheduling update for the first calendar in a data transmission from the remotely located device via a wireless communication network. A determination is made whether the proposed scheduling update conflicts with a previously entered update. If a decision has been made to accept the first proposed update of the calendar, the update is entered into the first calendar.

In a preferred embodiment, if a decision is made to accept the first proposed scheduling update, an acceptance message is transmitted to the remotely located device via the wireless communication network. The acceptance message includes instructions to enter the proposed scheduling update to the second calendar supported by the remote device. If a decision is made to reject the first proposed scheduling update, a rejection message is transmitted to the remotely located device with instructions not to enter the first proposed scheduling update to the second calendar.

A third response to the proposed scheduling update includes a proposed rescheduling of the first proposed scheduling update if the originally proposed scheduling update conflicts with a previously entered calendar update. The proposed rescheduling, which includes at least one proposed alternative rescheduling time, is transmitted to the remotely located device via the wireless communication network. A confirmation of a rescheduling time is then received from the remotely located device.

In one preferred embodiment, the data transmissions to and from the remotely located device are in the form of paging messages directed through a paging service provider. In a second preferred embodiment, the data transmissions are in the form of e-mail messages transmitted via a cellular telephone network. In a third embodiment, the transmissions are in the form of infra-red signals.

A portable electronic organizer for reconciling the first calendar supported by the organizer with the second calendar supported by the remotely located device includes the receiver for receiving a first wireless data transmission which includes the proposed scheduling update to the first calendar and a memory having storage for data comprising the first calendar. A display, which is responsive to the receiver, displays a graphical representation of the first calendar and the proposed scheduling update. A user interface is configured to transmit control signals in response to manipulation of the user interface by the user. A processor is connected to the memory to execute a calendar control program, the processor being configured to effect a scheduling update in response to an update control signal received from the user interface.

A preferred embodiment of the portable electronic organizer includes a transmitter for transmitting a second wireless data transmission in response to the first proposed scheduling update, the second transmission including either a scheduling update acceptance, a scheduling update rejection, or a rescheduling proposal. The receiver is configured to direct a confirmation control signal to the processor in response to a rescheduling confirmation message received from the remotely located communication device, the confirmation control signal causing the processor to enter the proposed rescheduling update into the calendar.

BRIEF DESCRIPTION OF THE DRAWINGS

FIG. 3 is a schematic representation of a display screen of the portable electronic organizer illustrated in FIG. 2.

DETAILED DESCRIPTION

Figure 1:
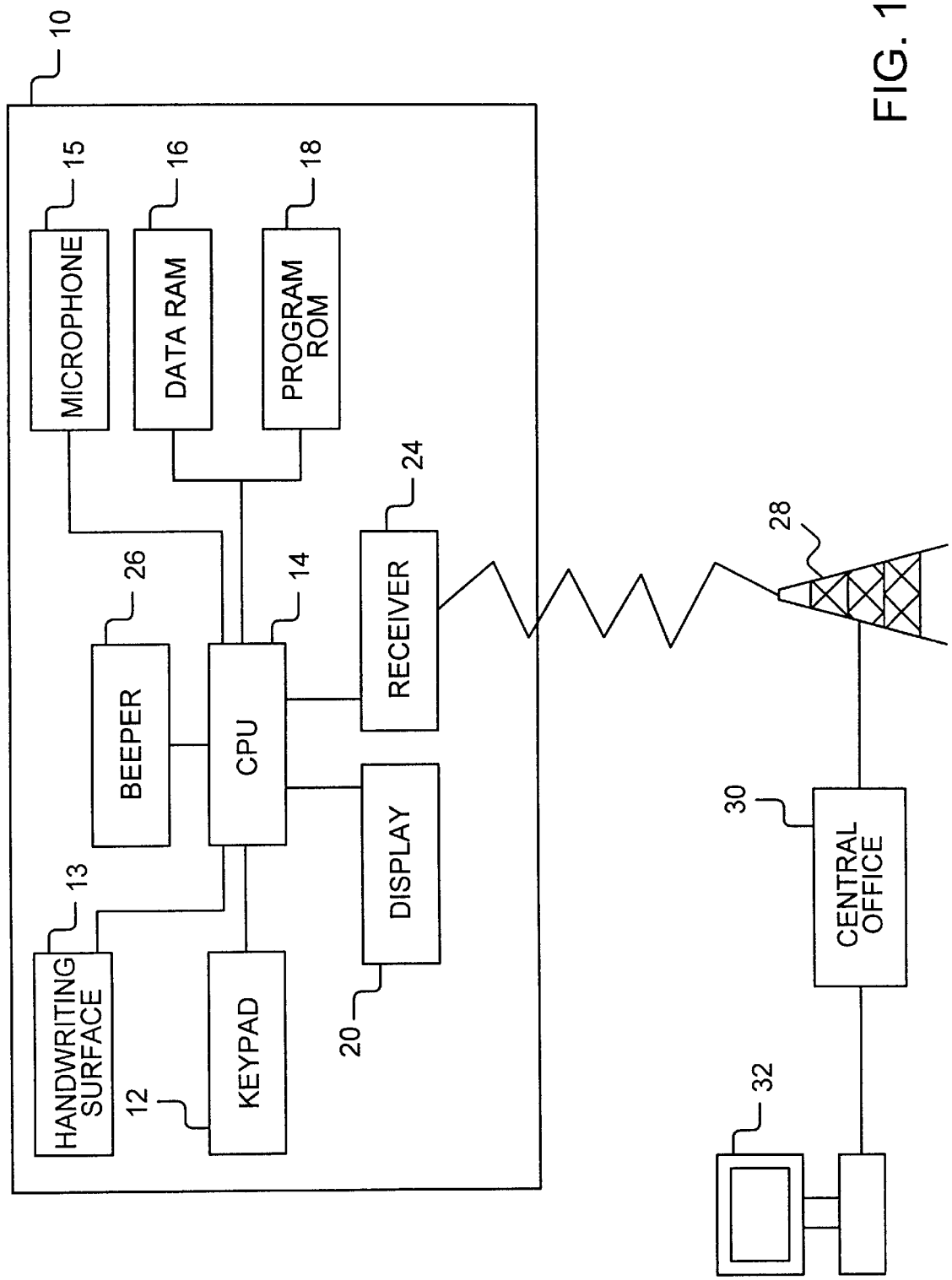
FIG. 1 is a block diagram of an embodiment of a portable electronic organizer with one-way communication capability and the interaction of the portable electronic organizer with a calendar-supporting computer.

With reference to FIG. 1, a first embodiment of a calendar-supporting portable electronic organizer 10 includes a read-only-memory (ROM) 18 which stores a calendar program executed by a central processing unit (CPU) 14. A data random access memory (RAM) 16 stores user data, including scheduling data associated with the calendar. Other user data stored in the RAM 16 includes telephone and address information and task lists. Alternatively, a small hard disk drive, static RAM, flash memory, or any comparable means of storing data (not shown) can be employed as a substitute for the RAM 16, or the hard disk drive may be used to supplement the RAM 16.

A set of keys of a keypad 12 provides the user with an interface to control the portable electronic organizer 10. By manipulating the keypad 12, a user is able to direct the CPU 14 to access data stored in the RAM 16 and ROM 18 in order to perform functions, such as calendar updates. A microphone 15 records voice information spoken by the user, enabling the user to enter calendar updates orally. The CPU 14 is configured to execute a voice recognition program stored in the ROM 18, enabling the electronic organizer 10 to convert the voice information captured by the microphone 15 into executable commands. The CPU 14 is configured to execute a handwriting recognition program stored in the program ROM 18 to provide an additional user interface. A pressure-sensitive writing surface 13 registers the user's handwriting and transmits the registered data to the CPU 14 for analysis. A display 20, such as an LCD, provides a user with a graphical representation of calendar information stored in the RAM 16, as well as proposed schedule update information received from a remote device, such as a calendar-supporting computer 32. A receiver 24 is configured to receive schedule update information transmitted from the calendar-supporting computer 32 via a central office 30 and a wireless telecommunication relay station 28. An incoming transmission indicator, such as a beeper 26, alerts the user when an incoming call is received.

Figure 2:
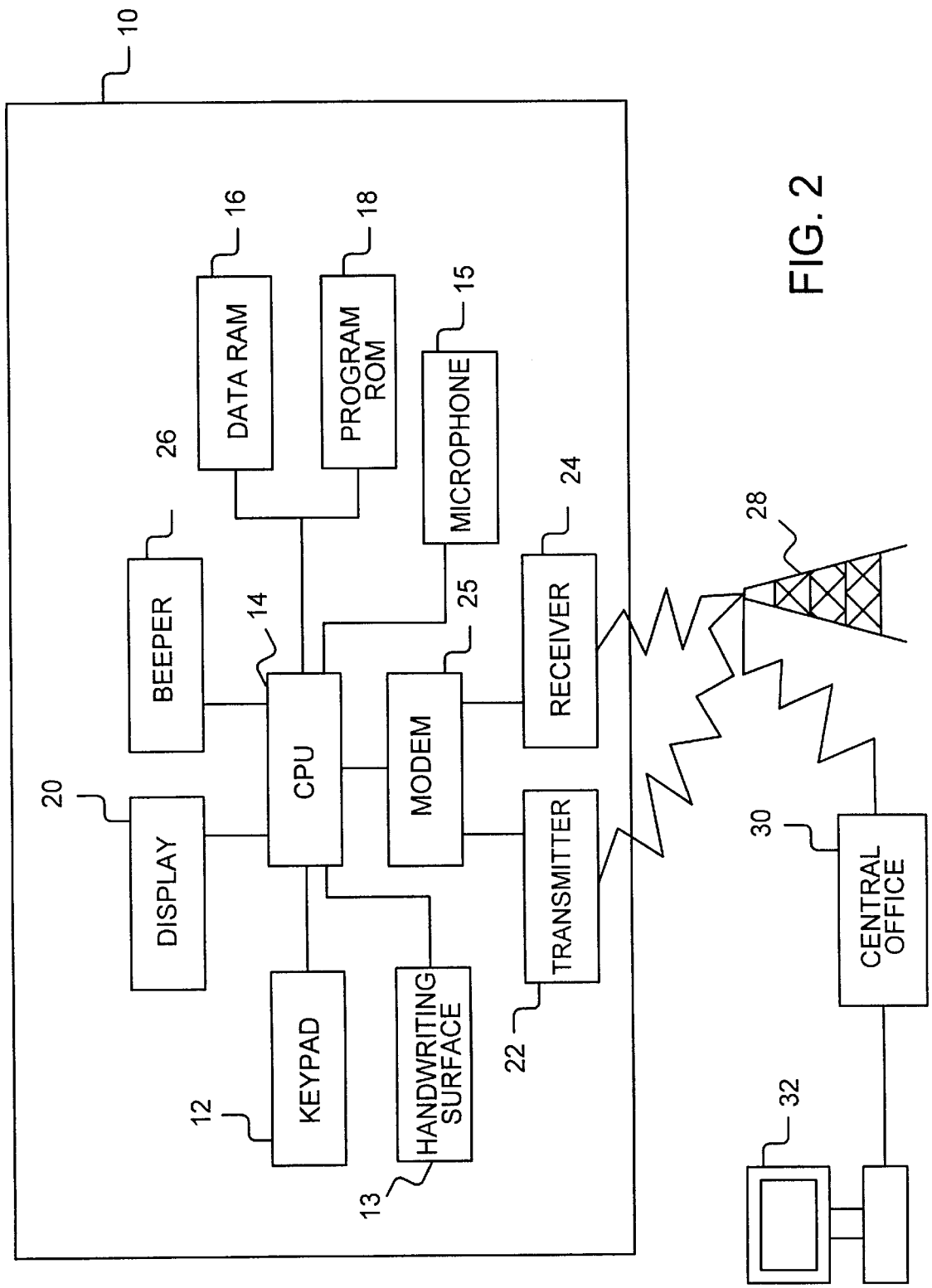
FIG. 2 is a block diagram of an embodiment of the portable electronic organizer with two-way communication capability.

FIG. 2 illustrates a preferred embodiment of the portable electronic organizer 10 in which the organizer has a two-way communication capability with the remotely located calendar-supporting computer 32. In addition to the receiver 24, the organizer 10 is equipped with a transmitter for transmitting messages to the computer 32 via the wireless communication relay station 28 and the central office 30.

Returning to FIG. 1, as previously noted, the electronic organizer 10 is only capable of receiving data from the calendar-supporting computer 32. Typically, the user of the portable electronic organizer 10 will maintain a calendar on both the computer 32 and the organizer 10. The computer 32 might be located in the user's office, where it is maintained by an assistant. The electronic organizer 10 enables the user to access and update a copy of the calendar when the user is away from the office. The receiver 24 enables the user to receive proposed schedule update information from the office computer 32. Typically, the office assistant will receive a request to schedule an appointment with the user. The assistant will consult the version of the user's calendar supported by the computer 32 to determine a possible meeting time and, perhaps, a meeting location as well. Upon determining a feasible meeting time, the assistant transmits a proposed scheduling update to the organizer 10.

The embodiment of the organizer 10 illustrated in FIG. 1 utilizes either a numeric or an alpha-numeric cellular paging system to communicate with the computer 32. If a numeric paging system is employed, a coding protocol is employed to convert alpha-numeric messages to a numeric format at the transmitting end and to convert the numeric format to an alpha-numeric format at the receiving end. Alternatively, an alpha-numeric paging system is employed, which obviates the need for the coding and decoding capability of the calendar.

Upon receiving the proposed scheduling update information, the CPU 14 activates the beeper 26 to alert the user that the scheduling update has been received and causes the scheduling update information to appear on the display 20, together with the scheduling information stored in the RAM 16 previous to receiving the proposed update. The user is able to compare the proposed update with the schedule for the date of the proposed meeting to determine if any conflict exists. If a conflict exists, the user might choose to reject the proposed update, or the user might choose to enter the update and reschedule the previously scheduled meeting. Whatever decision the user makes, the user is limited to entering the schedule update locally on the organizer, because the organizer is equipped only for receiving data. To reconcile the organizer calendar with the computer calendar, the user must communicate the update information by a means other than the organizer, for instance by telephone or a subsequent RS-232 connection.

Turning to FIGS. 2 and 3, a preferred embodiment of the organizer provides the user with two-way communication capability. Upon receiving the proposed scheduling update information from the computer, the CPU 14 causes the proposed scheduling update information to appear on the display 20 as shown in FIG. 3. The proposed update information appears on the left side of a split screen showing the date of the proposed meeting, the time and place, as well as the individual or group with whom the meeting is proposed. On the right side of the split screen appears the previously scheduled appointments for the same date as the proposed update.

At the bottom of the screen appear three options for the user to respond to the proposed update: accept, reject, and propose alternative. If the user selects the first option, for instance, by depressing the number one key of the keypad 12, the CPU 14 automatically enters the proposed update into the RAM 16. Furthermore, the CPU causes the transmitter 22 to transmit a message via the wireless communication network relay station 28 to the computer 32 with instructions to enter the proposed update into the calendar supported by the computer 32. If the user selects the reject option by pressing the number two key, the schedule option is not entered into the RAM 16 and the transmitter 22 transmits a reject message to the computer with instructions to not enter the proposed update into the computer calendar.

If the user selects the third option by pressing the number three key of the keypad 12, the user must choose at least one alternative time for which the meeting can be rescheduled. The user utilizes the keypad 12 to direct the CPU 14 to access the calendar stored in the RAM 16 to determine available rescheduling times. The proposed rescheduling times are transmitted by the transmitter 22 to the computer 32 with instructions directing the office assistant to select from one of the proposed rescheduling times. After a selection has been made, the selected rescheduling time is transmitted to the organizer 10, where the receiver 24 relays the rescheduling data to the CPU 14. The CPU 14 activates the beeper 26 to inform the user of the receipt of the rescheduling data and enters the rescheduling data into the RAM 16. The CPU 14 also causes the rescheduling data to appear on the display 20 to alert the user to which rescheduling time was selected.

The messages transmitted between the computer 32 and the electronic organizer 10 can be formatted for transmission via a numeric paging system or an alpha-numeric paging system. As previously noted, if the messages are formatted for transmission via a numeric paging system, a coding protocol is required in order to transmit messages having alpha-numeric content. The technology used to transmit the data (either in numeric or alpha-numeric form) between the wireless relay station 28 and the electronic organizer 10 can be either analog cellular telephone technology or personal communication system (PCS) digital wireless technology. PCS technology is preferred because of the higher bandwidth which PCS provides as a result of data channels built into the PCS framing structures.

Another possible format for the messages transmitted between the computer 32 and the electronic organizer 10 is infra-red signaling. Infra-red signal transmission and reception techniques are well known.

The messages exchanged between the computer 32 and the electronic organizer 10 can also be transmitted in the form of e-mail messages. For example, if the computer 32 transmits a proposed scheduling update in e-mail form, the message is transmitted over the Internet to an e-mail address assigned to the electronic organizer 10. A wireless modem 25 provides signal modulation functions for the embodiment utilizing analog wireless technology.

The two-way communication capability of the electronic organizer illustrated in FIG. 2 enables a user to propose schedule updates. For instance, if the user is away from the office and receives a request for a meeting with a client, the user is able to update the organizer calendar locally utilizing the keypad 12 to direct the CPU 14 to enter the scheduling update into the RAM 16. The CPU is also directed to cause the transmitter 22 to transmit the scheduling update information to the computer to reconcile the computer calendar with the organizer calendar. For another example, a proposed scheduling update might be received from the computer 32 that conflicts with a previously scheduled meeting in the organizer calendar which has not yet been entered into the computer calendar. If the proposed meeting has a higher priority than the previously entered meeting in the organizer calendar, the user might wish to accept the proposed schedule update and reschedule the previously entered meeting. The user reschedules the lower priority meeting, enters the rescheduling update locally into the RAM 16, and transmits a scheduling update message to the computer 32. An accept message is also transmitted, instructing the computer 32 to enter the higher priority meeting into the computer calendar, and the higher priority meeting is entered locally into the organizer calendar in the time slot formerly occupied by the lower priority meeting.

Figure 4:
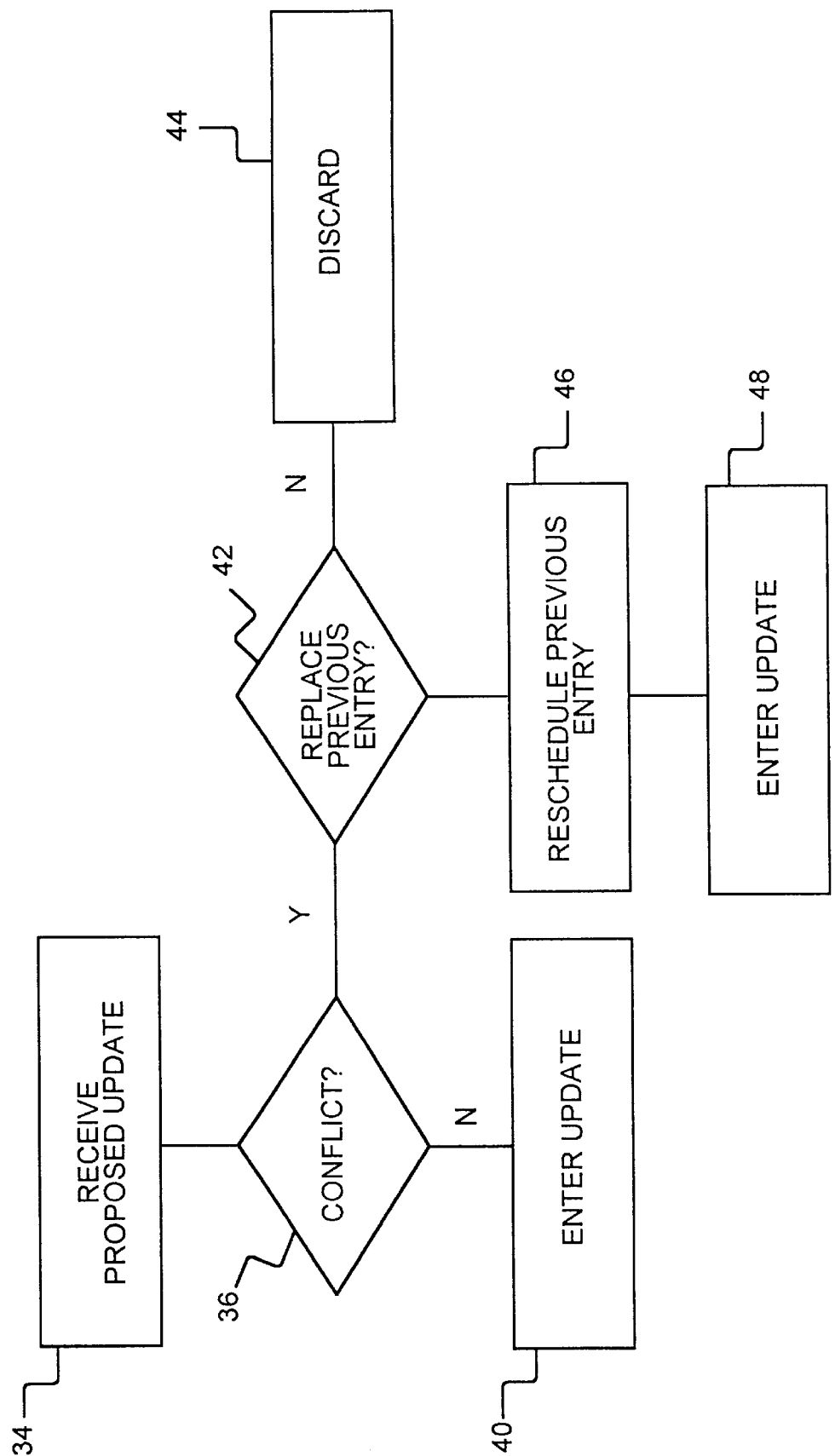
FIG. 4 is a flow diagram of a method of updating a calendar supported by an embodiment of the electronic organizer illustrated in FIG. 1.

Referring to FIGS. 1 and 4, a method for updating the calendar supported by the electronic organizer 10 configured for one-way communication includes receiving a wireless transmission from the computer 32 in step 34 including a proposed scheduling update from the computer 32. The receiver 24 transfers the scheduling update data to the CPU 14, which accesses the scheduling data stored in the RAM 16 for the date of the proposed meeting. The CPU 14 causes the proposed scheduling data and the stored scheduling data to appear on the display at the same time to enable the user to determine if a scheduling conflict exists in step 36.

Although it is possible to employ the CPU 14 to electronically determine whether the scheduling conflict exists, for several reasons it is preferable to allow the user to make this determination. Sometimes a scheduling conflict will not be readily apparent to the CPU 14 because, although the timing of a previously scheduled meeting does not overlap with the proposed update, the location of the previously scheduled meeting makes it impossible to attend the proposed meeting. Furthermore, the previously scheduled meeting might be with an individual who consistently overruns the allotted meeting time. Consequently, the user is usually in a better position to determine whether a scheduling conflict exists.

If no scheduling conflict is found, the scheduling update is entered into the RAM 16 by the CPU 14 in step 40. If a conflict is found, a determination is made in step 42 whether to replace the previously scheduled meeting with the proposed update. Although the determination can be made by the CPU 14, it is best made by the user because a number of variables are involved in making the decision. Factors such as the relative importance of the client, the relative importance of the subject matter underlying the meeting, and how prepared the user will be for the meeting all enter into the decision of whether to replace the previously scheduled meeting with the proposed update. The CPU 14 is not well equipped to take into account such factors in making the decision. If the user decides not to replace the previously entered meeting, the proposed scheduling update is discarded in step 44.

If in step 42 the user decides to replace the previously scheduled meeting, the meeting is rescheduled in step 46. The user can consult the calendar by directing the CPU 14 to search the calendar data in the RAM 16 to determine a time available for rescheduling. In step 48, the proposed scheduling update is entered into the RAM 16, thereby completing the calendar update.

Figure 5:
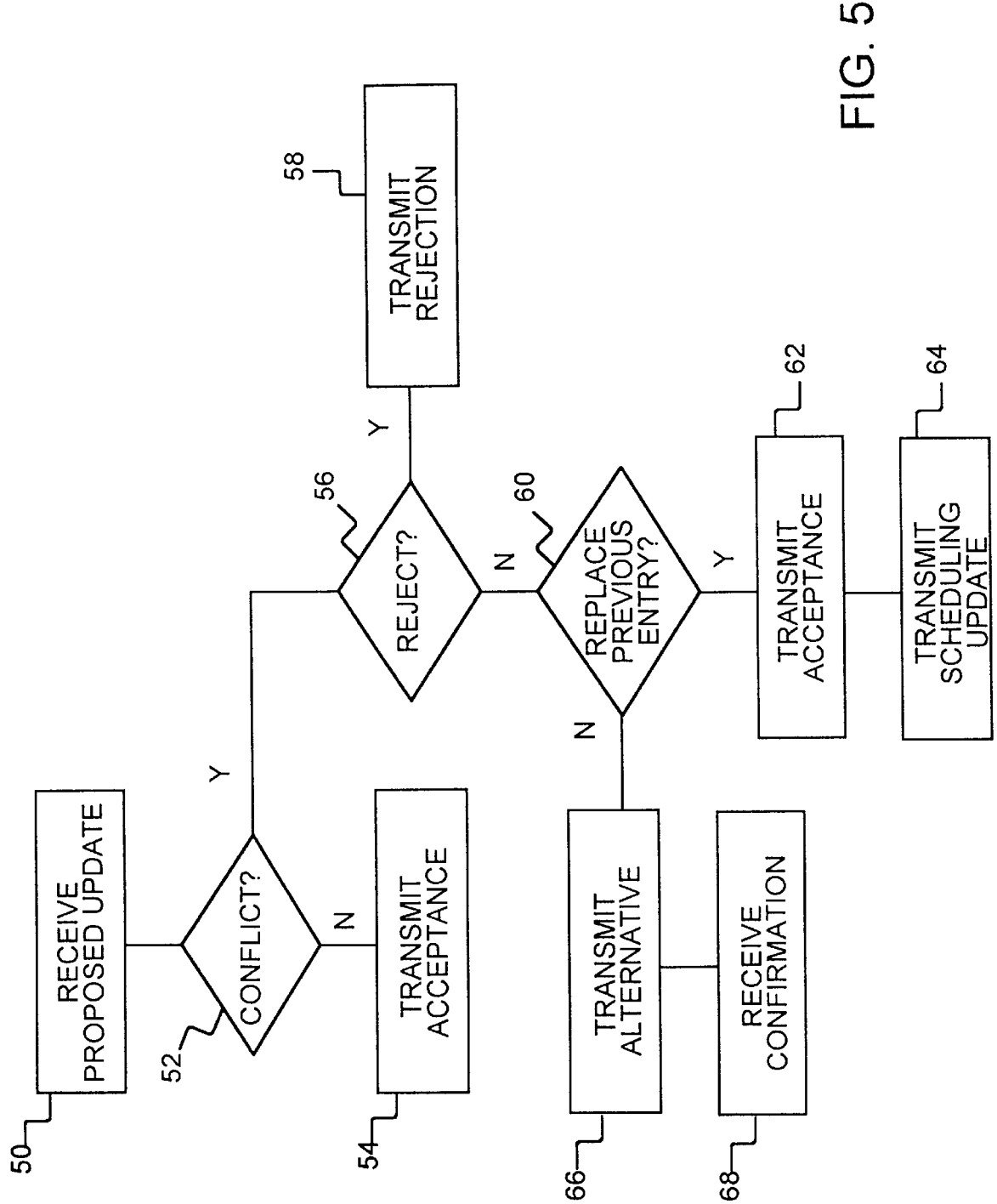
FIG. 5 is a flow diagram of a method of updating a calendar supported by a preferred embodiment of the electronic organizer illustrated in FIG. 2.

Referring to FIGS. 2 and 5, a method for reconciling two separately maintained calendars includes receiving a wireless transmission from the computer 32 containing information including a proposed scheduling update in step 50. As previously noted, the communication can be transmitted in the form of a numeric paging message, an alpha-numeric paging message, or an e-mail message via the Internet. Furthermore, the messages can be transmitted over an analog wireless telecommunications network or a PCS network. In step 52, it is determined whether the proposed scheduling update conflicts with an earlier entered meeting. If no conflict exists, in step 54 an acceptance message is transmitted from the organizer 10 to the computer, instructing the computer 32 to enter the proposed scheduling update into the computer calendar. The organizer 10 also enters the proposed scheduling update into the organizer calendar locally.

If a scheduling conflict exists with the proposed scheduling update, in step 56 it is determined whether to accept or reject the proposed scheduling update. If it is decided to reject the proposed update, in step 58 a rejection message is transmitted to the computer 32. As noted above, the decision whether to accept or reject the update can be performed by the CPU 14. However, the decision is preferably performed by the user of the organizer 10. If in step 56 the user decides to accept the proposed update, in step 60 the user decides whether to replace the previously scheduled meeting with which the proposed update conflicts. If the user decides to replace the previously scheduled meeting with the proposed update, then an acceptance message is transmitted to the computer 32, instructing the computer to enter the proposed update into the computer's calendar in step 62. The CPU 14 enters the update into the calendar stored in the RAM 16. The user accesses the organizer calendar to determine a feasible rescheduling date for the previously entered meeting replaced by the update. Upon ascertainment of a suitable rescheduling time, in step 64 the organizer 10 transmits a scheduling update containing the rescheduling information to the computer 32 and the CPU 14 locally enters the schedule update into the data RAM 16.

If in step 60 the user decides not to replace the previously entered meeting, the user consults the calendar to determine at least one alternative time for the proposed schedule update. A set of alternative times is transmitted to the computer 32 in step 66 from which a rescheduling time for the proposed update is selected. Once a rescheduling time has been selected by the assistant, a confirmation is received from the computer 32 in step 68, indicating the selected rescheduling time for the update. The rescheduling time is then entered into the RAM 16 to complete the calendar update.

The wireless calendar update capability of the portable electronic organizer of the present invention provides a user with the ability to coordinate the user's organizer calendar with a remotely maintained calendar. Prior art portable electronic calendars require a user to physically connect the portable electronic calendar to a calendar-supporting desktop computer to perform an update, leaving open the possibility that a scheduled meeting entered into the computer calendar might be missed if the user is unable to connect to the computer to update the organizer calendar before the time of the scheduled meeting. In contrast, the portable electronic organizer of the current invention enables near instantaneous updating of the organizer calendar from the desktop computer calendar via a wireless link. Likewise, with the two-way communication embodiment, updates from the organizer to the desktop computer prevent an office assistant from entering a scheduled meeting during a time which the user has already scheduled a meeting.

What is claimed is:

1. A method for reconciling a first calendar supported by a portable electronic organizer with a second calendar supported by a remotely located device, said first and second calenders being independently updatable and maintainable, said method comprising the steps of:

as a preliminary step to entering a first proposed scheduling update into said second calendar of said remotely located device, transmitting a first wireless signal that includes information indicative of said first proposed scheduling update;

receiving said first wireless signal at said portable electronic organizer over a wireless communication link;

determining whether said first proposed scheduling update conflicts with a previously entered scheduling update of said first calendar;

enabling a user to accept said first proposed scheduling update if a conflict with said previously entered scheduling update is identified;

entering said first proposed scheduling update into said first calendar if it is decided to accept said first proposed scheduling update of said calendar; and transmitting a second wireless signal from said portable electronic organizer to said remotely located device such that said second wireless signal is indicative of responsiveness to entering said first proposed scheduling update into said first calendar of said portable electronic organizer.

2. The method of claim 1 wherein said second wireless signal is one of:

an acceptance message if it has been decided to accept said first proposed scheduling update, said acceptance message including instructions to enter said first proposed scheduling update to said second calendar maintained by said remote device;

a rejection message if it has been decided to reject said first proposed scheduling update, said rejection including instructions to not enter said first proposed scheduling update to said second calendar; and a response message relating to a proposed rescheduling of said first proposed scheduling update, said response message including a proposed alternative rescheduling time.

3. The method of claim 2 further comprising the step of:

receiving a confirmation of said proposed alternative rescheduling time from said remotely located device.

4. The method of claim 3 further comprising the step of:

transmitting a second proposed scheduling update of said first calendar to said remotely located device together with instructions to enter said second proposed scheduling update into said second calendar, said second update and said instructions to enter said second proposed scheduling update being transmitted via said wireless communication link; and receiving an acknowledge message responsive to said second proposed scheduling update from said remotely located device via said wireless communication link, said acknowledge message indicating receipt of said second proposed scheduling update.

5. The method of claim 1 wherein said step of transmitting said second wireless signal includes transmitting information via a paging service provider.

6. The method of claim 1 wherein said step of transmitting said second wireless signal includes transmitting information in an e-mail message.

7. The method of claim 1 wherein said step of receiving said data transmission over said wireless communication link includes receiving said data transmission via a paging service provider.

8. The method of claim 1 wherein said step of receiving said data transmission over said wireless communication link includes receiving said data transmission in the form of an e-mail message.

9. A portable electronic organizer for reconciling a first calendar supported by said organizer with a second calendar supported by a remotely located device comprising:

means for receiving a first wireless data transmission from said remotely located device via a wireless communication network, said data transmission including a first proposed scheduling update to said first calendar wherein said first wireless data transmission being generated absent entry of said first proposed scheduling update into said second calendar;

memory having stored data representative of said first calendar;

a display, responsive to said receiving means, configured for displaying said first calendar and said first proposed scheduling update to said first calendar;

processor means, connected to said memory, for executing a calendar control program, said processor means being configured to effect a first scheduling update to said first calendar in response to reception of a first control signal;

a user interface cooperatively associated with said processor means, said user interface being configured to transmit control signals in response to manipulation of said user interface, said control signals including said first control signal; and means for transmitting a second wireless data transmission to said remotely located device via said wireless communication network in response to said first wireless data transmission, said second wireless data transmission being directed to update said second calendar.

10. The organizer of claim 9 wherein said second transmission includes one of a scheduling update acceptance, a scheduling update rejection, and a rescheduling proposal.

11. The organizer of claim 9 wherein said transmitting means includes a modem output configured to transmit, in the form of an e-mail message, one of said scheduling update rejection, said scheduling update acceptance, a scheduling update proposal, and said rescheduling update proposal via said wireless telephone network.

12. The organizer of claim 9 wherein said transmitting means includes circuitry enabled to transmit messages to said remotely located device via a paging service provider.

13. The organizer of claim 9 wherein said transmitting means is configured to transmit a second proposed scheduling update to said remotely located device.

14. The organizer of claim 10 further comprising a hand-held housing containing said means for receiving, said memory, and said processor.

15. The organizer of claim 9 wherein said receiving means is configured to transmit a second control signal to said processing means in response to a third wireless data transmission from said remote device, said third wireless data transmission including a rescheduling confirmation transmitted by said remotely located device, said second control signal triggering a second scheduling update executed by said processing means.

16. The organizer of claim 9 wherein said receiving means includes circuitry enabled to receive paging signals from a paging service provider.

17. The organizer of claim 9 wherein said receiving means includes a modem input enabled to receive said proposed scheduling update in the form of an e-mail message.

18. A method for reconciling a first calendar supported by a portable electronic organizer with a second calendar supported by a remotely located device, said method comprising the steps of:

receiving a wireless data transmission via a wireless communication network from said remotely located device including a proposed scheduling update for said first calendar absent entering said proposed scheduling update into said second calendar;

accessing said first calendar from a memory storage;

determining whether said proposed scheduling update conflicts with a previously scheduled entry in said first calendar;

enabling a user to enter said proposed schedule update into said first calendar;

transmitting a response to said proposed scheduling update to said remotely located device in the form of a wireless data transmission via said wireless communication network, said response including one of a proposed update rejection, a proposed update acceptance, and a proposed alternative scheduling update;

receiving a confirmation of said proposed alternative scheduling update via said wireless communication network if a proposed alternative scheduling update is transmitted;

entering said proposed scheduling update into said first and second calendars if it is decided to accept said proposed scheduling update; and entering said proposed alternative scheduling update into said first and second calendars if said confirmation is received.

19. The method of claim 18 wherein said step of receiving said proposed scheduling update and said step of receiving said confirmation include receiving data transmissions from a paging service provider, and further, wherein said step of transmitting said response to said proposed scheduling update includes transmitting said response via said paging service provider.

20. The method of claim 18 wherein said step of receiving said proposed scheduling update and said step of receiving said confirmation include receiving an e-mail message via a wireless connection to an Internet, and further, wherein said step of transmitting said response to said proposed scheduling update includes transmitting said response via said wireless connection to said remotely located device via said Internet.

* * * * *